3,761,431
BAGASSE REINFORCED VINYL ROOFING COMPOSITION

Roland Botz, Mercedita, Puerto Rico, assignor to Plasti-Fiber Formulations, Inc., Mercedita, Puerto Rico
No Drawing. Filed Apr. 16, 1971, Ser. No. 134,907
Int. Cl. C08g 45/18
U.S. Cl. 260—17.4 CL            7 Claims

ABSTRACT OF THE DISCLOSURE

A roofing composition based on a vinyl acetate polymer, a fibrous bagasse filler and a pigment.

---

This invention relates to roofing compositions and in particular to compositions especially suited for roofs which are to endure tropical conditions.

Various types of materials are used to cover roofs. In the temperate zones asphalt or tar are often employed, but these materials are not well suited for use in tropical climates because of their tendency to soften and melt and their tendency to absorb rather than reflect heat. Mixtures of paint with fibers such as sisal and asbestos have been employed but these have not been altogether successful for one reason or another.

In my copending application, Ser. No. 866,123, filed Oct. 9, 1969 now Pat. No. 3,694,308, there is disclosed a new product derived from bagasse. The product may be a fiber or a powder, but it is characterized, inter alia, by being associated with an appreciable quantity of alum.

I have now found that when this novel bagasse material is compounded with a vinyl acetate polymer, or more preferably a copolymer of vinyl acetate and ethyl or butyl acrylate, and a suitable pigment, the resulting composition can be used as a roofing material to great advantage. It is easy to spread over any surface and covers well. The fibers being of porous structure, give excellent heat and sound insulation. When pigmented with a white pigment it retains that color. It is completely waterproof. It is abrasion resistant and flexible enough not to crack despite the effects of tropical sun and rain, even if the underlying substrate cracks. It is quite inexpensive.

As indicated above the novel composition contains three principal ingredients: bagasse fibers made according to my prior invention, a vinyl acetate homopolymer or copolymer, and a pigment. Sufficient water is, of course, also present to provide the proper viscosity and mobility.

The bagasse fibers described in my copending applications are made by contacting bagasse without any prior digestion or other chemical treatment with an aqueous alum solution. This treatment serves to leach residual sugar from the bagasse. Concurrently (or before or subsequent thereto) the bagasse is subjected to mechanical attrition to defibrate it. Fibers are then separated from pulp and other foreign matter, and dried. A certain amount of alum, say 0.1–0.4%, is retained on the fibers at least a portion of said alum being in the form of a coating on the cells and outer surfaces.

For use in the present invention the bagasse fibers are preferably reduced in size to one-quarter inch or less.

In reducing the size of the bagasse fibers, a certain amount of fine flour is obtained. This is also useful as a filler in the present formulation, though its inclusion may be regarded as optional.

The proportion of bagasse fibers used in the composition may vary considerably, depending on the effect desired. Generally between about 5 and about 15% on the weight of total solids will be employed.

The polyvinyl acetate ingredient is preferably a copolymer of vinyl acetate and an ester of acrylic acid and a lower alkanol, typically ethyl acrylate or butyl acrylate. Mixed esters, such as a mixture of ethyl acrylate and butyl acrylate may also be used. In such copolymers the weight proportion of vinyl acetate will normally be from 70 to 80%. The molecular weight of the copolymer will range from say 100,000 to 500,000.

As an alternative, in place of the vinyl acetate-acrylate copolymer, a vinyl acetate homopolymer of equivalent molecular weight may be employed. This is not as satisfactory, however, because it is not as water resistant, requires a longer curing time, and has poorer body. Moreover, the copolymer gives a more uniform dispersion. This results in a more attractive product, particularly where a white pigment is used.

Mixtures of the homopolymer and copolymer may also be employed.

The polyvinyl acetate ingredient may be introduced as any one of a number of commercial formulations. For the copolymer, Wallpol 40–133, a 55% dispersion of a copolymer of vinyl acetate, 2-ethylhexyl acrylate and butyl acrylate, containing 70–80% vinyl acetate, made by Reichhold Chemicals, Inc., has been found especially suitable. As the vinyl acetate homopolymer, Plyamul 40–155, a Reichhold Chemical product containing about 55% solids has proven suitable. The proportion of vinyl acetate ingredient used will normally be from about 35 to about 45% based on total composition solids.

As the third ingredient, any suitable pigment may be employed. For most tropical applications a white surface will be desired and pigments such as titanium dioxide and whiting are preferred. Other similar inert materials, usually mineral in nature, may be used as desired. The pigment will comprise between about 15 and about 35% by weight solids.

As a convenient way to introduce pigment into the formulation, I have found that any of the conventional water based paints may be used. In these paints the pigments are already well dispersed and extended grinding and mixing of the entire formulation is avoided. Preferably the paint should have as its film forming ingredient the same polymer used as the vinyl acetate ingredient of the formulation or at least a polymer compatible therewith. In such case the proportion of vinyl acetate ingredient added as such may be reduced proportionately.

It has also proved useful to add to the formulation a small amount of free alum in finely divided form. The term "free alum" is used to distinguish over the alum present in the fiber. Generally between about 0.5 and about 1.5% free alum, on the weight of solids, will be sufficient. The alum appears to enhance the appearance of the compositions, particularly its color after prolonged exposure to intense sunlight.

Finally it is desirable to include an effective amount of a fungicide. This will normally be on the order of 0.5 to 1.5% on solids. Any conventional fungicide may be used such for example as phenyl mercuric acetate.

The composition also contains water. The amount of water present is variable to a great extent, depending on the consistency and mobility desired. In general the composition will be 50–60% water or 100–150% based on total solids.

In preparing compositions according to the invention the polyvinyl acetate ingredient, in the form of an emulsion, is mixed in a good mixing device with the fibers, and alum, if the latter is employed, until a homogeneous suspension is obtained. The pigment is then added preferably as a water based paint and again mixing is carried out to homogeneity. Additional water may be added to give the desired consistency.

The composition may be applied to almost any surface including concrete (cured or uncured), wood, cinderblock, brick, asphalt, masonry or metal. In applying the composition the surface is first cleaned of oils, loose concrete and any fungus growth. The composition is then applied by a broom, brush or roller. Drying takes about 24 hours with the PVA-acrylate copolymer, about a week with the PVA homopolymer.

The invention will be further described with reference to the following examples:

EXAMPLE 1

To 90 pounds of Walpol 40–133 (55% solids) and 90 pounds of Plyamul 40–155 (55% solids) in admixture with one another is added one pound of commercial grade alum dissolved in five gallons of water (41.6 lbs.). After thorough mixing approximately 20 lbs. of bagasse fiber made according to my copending application were added to the mixture. This fiber contained about 0.3% alum. After again mixing, approximately 11.8 pounds of a water base paint having the following formulation were added:

| Paint formulation: | Parts by weight |
|---|---|
| Tamol 731 (anionic surfactant) | 5.2 |
| Igepal CO–630 (anionic surfactant) | 3.0 |
| Lecithin | 2.0 |
| Carbitol acetate | 10.0 |
| Ethylene glycol | 20.0 |
| Hydroxyethyl cellulose (Cellosize 2P4400) | 6.0 |
| Antifoam (Nopco NDW) | 2.0 |
| Rutile | 250.0 |
| Calcined clay | 75.0 |
| Whiting | 150.0 |
| Phenylmercuric acetate | 5.0 |
| Walpol 40–133 (55% solids) | 225.0 |
| Water | 427.0 |

With further mixing the material is ready for application. It is applied to a concrete roof using a brush. It has a clean white appearance and a spongy texture.

EXAMPLE 2

To 55.5 lbs. of Walpol 40–133 is added 0.281 lbs. alum and 5.62 lbs. fiber according to application Ser. No. 866,123, now Pat. No. 3,694,308 and the mixture is stirred vigorously to give a smooth dispersion. About 13.5 lbs. of rutile are slurried in 25.2 lbs. of water and this is added with constant stirring to the previously prepared mixture. The combined mix is then applied to a concrete slab by roller. Drying occurs within 24 hours, to give a white spongy coating.

EXAMPLE 3

Example 2 is repeated using an equivalent amount of Plyamul 40–155 in place of the Walpol copolymer. A concrete roof is coated using a brush. After 7 days the surface is no longer tacky. It has a grayish cast compared to that of Example 2.

What is claimed is:

1. A roofing composition comprising an aqueous dispersion of
    (a) between about 55% and about 65% by weight of total solids of a vinyl polymer having a molecular weight of from about 100,000 to about 500,000 and selected from the group consisting of (1) vinyl acetate, (2) copolymers of vinyl acetate and an acrylic ester of a lower alkanol containing from about 70 to about 80 percent by weight vinyl acetate residues, and (3) mixtures of (1) and (2);
    (b) between about 5% and about 15% by weight of total solids of a bagasse filler containing between about 0.1 and about 0.4%, based on the weight of filler, of alum, at least a portion of said alum being present as a coating on the filler; and
    (c) between about 15% and about 35% by weight of total solids of a finely divided pigment.

2. The composition claimed in claim 1 wherein the vinyl polymer is a copolymer of vinyl acetate and the acrylic ester of an alkanol having not more than 5 carbon atoms.

3. The composition claimed in claim 2 wherein the vinyl polymer is a copolymer of vinyl acetate and ethyl acrylate.

4. The composition claimed in claim 2 wherein the vinyl polymer is a copolymer of vinyl acetate and a mixture of ethyl acrylate and butyl acrylate.

5. The composition claimed in claim 2 wherein the vinyl polymer is a copolymer of vinyl acetate and butyl acrylate.

6. The composition claimed in claim 1 and comprising between about 0.5 and about 1.5% by weight of total solids, of free alum.

7. The composition claimed in claim 1 and comprising a fungicide.

References Cited
UNITED STATES PATENTS

| 1,891,337 | 12/1932 | Seamon | 162—96 |
| 1,946,953 | 2/1934 | Sweeney | 162—96 |

OTHER REFERENCES

Chem. Absts., vol. 67, 1967, S. Kranz.

WILLIAM H. SHORT, Primary Examiner

E. WOODBERRY, Assistant Examiner

U.S. Cl. X.R.

117—121, 127, 148; 260—17.4 R